United States Patent
Yuan

(10) Patent No.: US 12,478,600 B2
(45) Date of Patent: Nov. 25, 2025

(54) APPLICATION OF THYROID HORMONES AND ITS ANALOGUES IN PREPARATION OF DRUGS FOR TREATING ALPHA-THALASSEMIA

(71) Applicant: SHANGHAI SPH RARE DISEASE PHARMACEUTICAL CO., LTD., Shanghai (CN)

(72) Inventor: Hao Yuan, Shanghai (CN)

(73) Assignee: SHANGHAI SPH RARE DISEASE PHARMACEUTICAL CO., LTD., Shanghai (CN)

(*) Notice: Subject to any disclaimer, the term of this patent is extended or adjusted under 35 U.S.C. 154(b) by 594 days.

(21) Appl. No.: 18/046,514

(22) Filed: Oct. 14, 2022

(65) Prior Publication Data

US 2023/0293470 A1    Sep. 21, 2023

Related U.S. Application Data

(63) Continuation of application No. PCT/CN2021/072745, filed on Jan. 19, 2021.

(30) Foreign Application Priority Data

Apr. 17, 2020  (CN) .......................... 202010304073.5

(51) Int. Cl.
*A61K 31/198* (2006.01)
(52) U.S. Cl.
CPC ................................. *A61K 31/198* (2013.01)
(58) Field of Classification Search
CPC .................................................... A61K 31/198
See application file for complete search history.

(56) References Cited

U.S. PATENT DOCUMENTS 6,022,738 A    2/2000    Atweh

OTHER PUBLICATIONS

Yazdanparast et al. CAS: 146: 198951, 2006.*
Malgor et al., Experimental Hematology, 1986, 14(4): 250-6.*
Duntas et al. Nutritional Neuroscience, 2000, 3(6): 407-414.*
"International Search Report (Form PCT/ISA/210) of PCT/CN2021/072745", mailed on Apr. 19, 2021, with English translation thereof, pp. 1-10.
"Written Opinion of the International Searching Authority (Form PCT/ISA/237) of PCT/CN2021/072745", mailed on Apr. 19, 2021, pp. 1-6.
J. E. Fuhr et al., "Control of Hemoglobin Synthesis in Fetal Erythroid Cells by L-Thyroxine," American Journal of Hematology, vol. 5, Dec. 1978, pp. 163-168.
J. E. Fuhr et al., "In Vitro Stimulation of Primate Hemoglobin Synthesis by L-Thyroxine," Blood, vol. 49, Mar. 1977, pp. 407-413.
Nurdan Evliyaoğlu et al., "Thyroid functions in mild and severe forms of sickle cell anemia," Acta Paediatrica Japonica, vol. 38, Apr. 1996, pp. 460-463.
Ashraf T Soliman et al., "Chronic anemia and thyroid function," Acta Biomed., vol. 88, Dec. 2017, pp. 119-127.

* cited by examiner

*Primary Examiner* — Rei Tsang Shiao
(74) *Attorney, Agent, or Firm* — JCIPRNET

(57) ABSTRACT

The present invention provides an application of thyroid hormones and its analogues in preparation of drugs for treating alpha-thalassemia, especially in preparation of drugs for regulating expression of zeta-globin gene. During differentiation of K562 cells, thyroid hormone analogue (Triac) can significantly up-regulate the expression of zeta-globin gene (HBZ) by 50 folds or above. The expression of zeta-globin gene (hbae5) can also be up-regulated by 30-70 folds in zebrafish treated with thyroid hormones and thyroid hormones analogues. Therefore, according to the present invention, the expression of zeta-globin gene can be significantly activated by thyroid hormones and its analogues, which may develop new potential therapies for patients with alpha-thalassemia. It provides an economical, safe and effective method for treating alpha-thalassemia and can be widely used.

1 Claim, 2 Drawing Sheets

Specification includes a Sequence Listing.

APPLICATION OF THYROID HORMONES AND ITS ANALOGUES IN PREPARATION OF DRUGS FOR TREATING ALPHA-THALASSEMIA

CROSS-REFERENCE TO RELATED APPLICATIONS

This application is a continuation of international PCT application serial no. PCT/CN2021/072745, filed on Jan. 19, 2021, which claims the priority benefit of China application serial no. 202010304073.5, filed on Apr. 17, 2020. The entirety of each of the above-mentioned patent applications is hereby incorporated by reference herein and made a part of this specification.

REFERENCE TO A SEQUENCE LISTING

The instant application contains a Sequencing Listing which has been submitted electronically in XML file and is hereby incorporated by reference in its entirety. Said XML copy, created on Oct. 12, 2022, is named 127695-0C_sequencing-listing and is 38,472 bytes in size.

BACKGROUND OF THE INVENTION

1. Technical Field

The present invention belongs to the technical field of thalassemia, and particularly relates to an application of thyroid hormones and its analogues in preparation of drugs for treating alpha-thalassemia.

2. Description of Related Art

The thalassemias are the most common monogenic diseases in the world, which have great influences on human health. These inherited disorders of hemoglobin synthesis are characterized by a reduced production of globin chains of hemoglobin. Worldwide, the most important forms are the alpha- and beta-thalassemias, which affect production of the alpha-globin and beta-globin chains, respectively. The number of alpha-thalassemia gene carriers is higher than that of beta-thalassemia gene carriers, and the number of patients with alpha-thalassemia intermediate (also known as HbH disease) and alpha-thalassemia major (also known as Hemoglobin Bart's hydrops fetalis) in China is much higher than that in other countries and regions of the world, so China is a veritable "hardest hit area" of alpha-thalassemia. However, there is no mature and effective method for treating such diseases so far. Therefore, patients with alpha-thalassemia face huge unmet medical demands.

Alpha-thalassemia refers to a hemolytic anemia caused by the destruction of erythrocytes due to a decrease of the synthesis of alpha-globin chains. There are four types of alpha-thalassemia, which are as follows: (1) silent alpha-carriers; (2) alpha-thalassemia minor; (3) alpha-thalassemia intermediate (also known as HbH disease); and (4) alpha-thalassemia major (also known as Hemoglobin Bart's hydrops fetalis). The patients with silent alpha-carriers and alpha-thalassemia minor do not need special treatment. However, some patients with HbH disease need blood transfusion. For infants with Hemoglobin Bart's hydrops fetalis, some hospitals have reported that intrauterine blood transfusion can relieve their symptoms, but up to now, there is still no effective treatment.

However, blood transfusion treatment may bring the following problems:

1. Blood transfusion will lead to iron overload to damage multiple organs, mainly affecting heart, liver, pancreas and various endocrine organs.
2. Blood transfusion will cause fever, chills, rash and other adverse effects, and will lead to acute hemolysis, tracheal contraction and blood pressure drop in severe cases.
3. Blood transfusion may pose a risk of infectious diseases through blood.
4. Intrauterine blood transfusion has high requirements and difficulty in technique, which makes it difficult to be widely used.
5. Blood transfusion has high cost, which will cause an economic burden especially for patients who need lifelong blood transfusion.

Zeta-globin is a type of alpha-like globin expressed only in an embryonic stage, which also has an oxygen-carrying function. A gene encoding this protein is well preserved in most patients with alpha-thalassemia, and its expression is gradually silenced during embryonic development. Studies have proved that in a lethal alpha-thalassemia mouse model, re-expression of zeta-globin by a transgenic method can fully restore normal development of the alpha-thalassemia mouse. Therefore, reactivation of zeta-globin gene expression in patients to replace the defective alpha-globin is expected to be an effective method for treating alpha-thalassemia. However, pharmacologic compounds capable of reactivating zeta-globin gene expression have not been yet available so far.

BRIEF SUMMARY OF THE INVENTION

To overcome the shortcomings of the prior art, the primary purpose of the present invention is to provide an application of thyroid hormones and its analogues in preparation of drugs for treating alpha-thalassemia.

A second purpose of the present invention is to provide an application of thyroid hormones and its analogues in preparation of drugs for regulating expression of zeta-globin gene.

To achieve the above primary purpose, the present invention provides the following solution:

Thyroid hormones and its analogues can be applied to preparation of drugs for treating alpha-thalassemia.

To achieve the above second purpose, the present invention provides the following solution:

Thyroid hormones and its analogues can be applied to preparation of drugs for regulating expression of zeta-globin gene.

Specifically, the thyroid hormones and its analogues can significantly up-regulate the expression of zeta-globin gene.

Triac (also known as Tiratricol or 3,3',5-triiodothyroacetic acid) (chemical name: 2-[4-(4-hydroxy-3-iodophenoxy)-3, 5-diiodophenyl] acetic acid; molecular formula: $C_{14}H_9I_3O_4$) is a thyroid hormone analogue for treating patients with thyroid hormone resistance syndrome, hyperlipidemia, localized lipodystrophy and obesity. In addition, Triac has also displayed therapeutic potential for the treatment of Allan-Herndon-Dudley syndrome.

The inventor has found that during the differentiation of K562 cells, Triac can significantly up-regulate the expression of zeta-globin gene (HBZ). Furthermore, Triac could also dramatically induce zeta-globin gene (hbae5) expression in zebrafish. In addition, the inventor has also found that the thyroid hormones (3,3',5-Triiodo-L-thyronine, referred to as T3 or 3,3',5,5'-tetraiodothyronine, referred to as T4)

had a similar effect. Therefore, the inventor discovered for the first time that the thyroid hormone analogue (Triac) and thyroid hormones (T3 or T4) could significantly induce zeta-globin gene expression both in vitro and in vivo, which may allow development of new therapies for alpha-thalassemia.

Specifically, Triac was purchased from Selleck Biotech Co., Ltd. of the United States, T3 (3,3',5-Triiodo-L-thyronine) was purchased from Sigma Company, and T4 (3,3',5,5'-tetraiodothyronine) was purchased from Biological Engineering (Shanghai) Ltd., Co.

By adopting the above solutions, the present invention has the following beneficial effects:

according to the present invention, thyroid hormones (T3 and T4) and thyroid hormone analogue (Triac) act as a potent inducer of zeta-globin expression, which may sever as a new potential therapeutic option for patients with alpha-thalassemia. It provides an economical, safe and effective method for the treatment of alpha-thalassemia, and can be widely used.

DETAILED DESCRIPTION OF THE INVENTION

The present invention provides an application of thyroid hormones and its analogues in preparation of drugs for treating alpha-thalassemia.

Experimental Materials:

K562 cells were cultured in RPMI 1640 medium supplemented with 10% (v/v) fetal bovine serum; Hemin was dissolved into 0.2 mol/L NaOH solution, and the working concentration for treating K562 cells is 20 μmon; Triac, T3 and T4 were dissolved into dimethyl sulfoxide (DMSO), and the working concentration for treating K562 cells and zebrafish embryos is 20 μmon and 5 μmon, respectively.

The present invention is further described below through specific embodiments.

Embodiment 1

In K562 cells, Triac significantly activated the expression of zeta-globin gene (HBZ) according to the following process:

K562 cells were treated with hemin or hemin plus Triac for 72 hours, respectively, centrifugation was performed at 2000 rpm for 5 minutes to collect cells, a TRIzol reagent (Invitrogen) was used to extract total RNA, then a reverse transcription kit (ReverTra Ace, TOYOBO) was used to synthesize cDNA, and finally, a SYBR Green Realtime PCR Master Mix (TOYOBO) reagent was used to perform quantitative PCR.

A quantitative PCR reaction system was as follows:

| | |
|---|---|
| 2xSYBR Green PCR Master Mix | 5 ul |
| F-Primer (10 μmol/L) | 0.6 ul |
| R-Primer (10 μmol/L) | 0.6 ul |
| cDNA | 1 ul |
| ddH2O | 2.8 ul |
| Total volume | 10 ul |

Conditions for a quantitative PCR reaction were as follows:

Hot start: 95° C., 10 minutes;

Denaturation: 95° C., 10 seconds; and

Annealing/stretching: 60° C., 30 seconds.

40 cycles.

Dissolution Curve Analysis.

Figure 1:
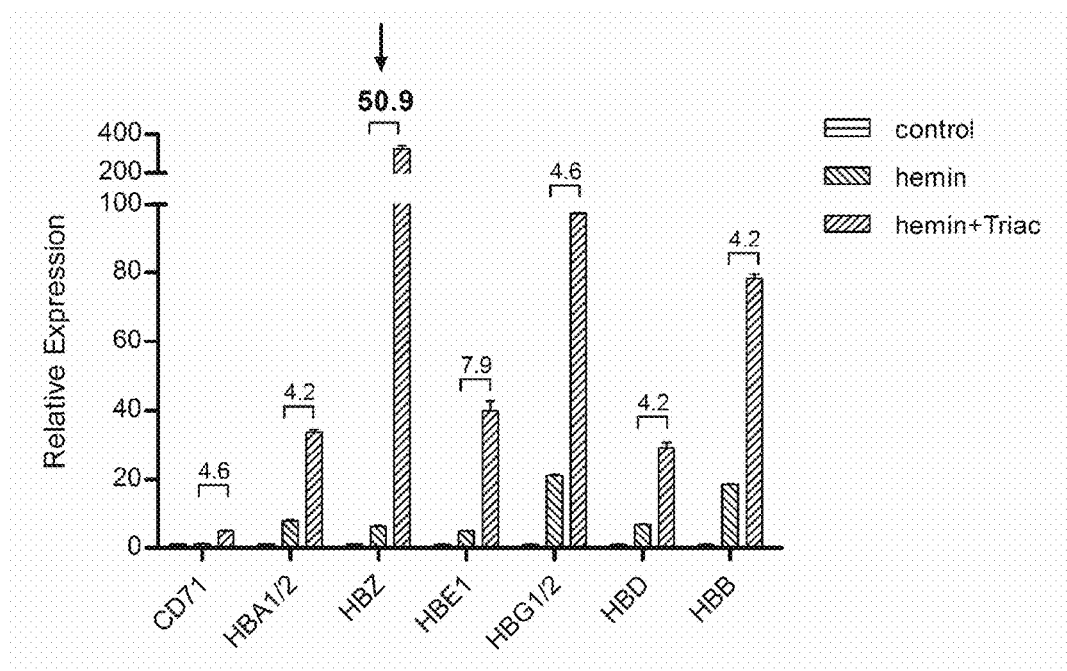
FIG. 1. The thyroid hormone analogue (Triac) induced zeta-globin gene (HBZ) expression in hemin-treated K562 cells.

As shown in FIG. 1, qPCR result shows that the expression of zeta-globin gene (HBZ) is up-regulated by 50.9 folds in Triac-treated K562 cells.

In fact, the sequence of human zeta-globin gene (HBZ) (NM_005332.3) (SEQ ID NO. 1) is as follows:

(SEQ ID NO. 1)
ATGTCTCTGACCAAGACTGAGAGGACCATCATTGTGTCCATGTGGGCCAAG

ATCTCCACGCAGGCCGACACCATCGGCACCGAGACTCTGGAGAGGCTCTTC

CTCAGCCACCCGCAGACCAAGACCTACTTCCCGCACTTCGACCTGCACCCG

GGGTCCGCGCAGTTGCGCGCGCACGGCTCCAAGGTGGTGGCCGCCGTGGGC

GACGCGGTGAAGAGCATCGACGACATCGGCGGCGCCCTGTCCAAGCTGAGC

GAGCTGCACGCCTACATCCTGCGCGTGGACCCGGTCAACTTCAAGCTCCTG

TCCCACTGCCTGCTGGTCACCCTGGCCGCGCGCTTCCCCGCCGACTTCACG

GCCGAGGCCCACGCCGCCTGGGACAAGTTCCTATCGGTCGTATCCTCTGTC

CTGACCGAGAAGTACCGCTGA

Realtime PCR primers are as follows:

| | |
|---|---|
| Human-β-actin-F | (SEQ ID NO. 2) |
| CCAACCGCGAGAAGATGA | |
| Human-β-actin-R | (SEQ ID NO. 3) |
| CCAGAGGCGTACAGGGATAG | |
| Human-HBA1/2-F | (SEQ ID NO. 4) |
| AAGGTCGGCGCGCACGC | |
| Human-HBA1/2-R | (SEQ ID NO. 5) |
| CTCAGGTCGAAGTGCGGG | |
| Human-HBZ-F | (SEQ ID NO. 6) |
| GGACCATCATTGTGTCCATGT | |
| Human-HBZ-R | (SEQ ID NO. 7) |
| GGGAAGTAGGTCTTGGTCTGC | |
| Human-HBE1-F | (SEQ ID NO. 8) |
| TGCATGTGGATCCTGAGAAC | |

-continued

Human-HBE1-R (SEQ ID NO. 9)
CGACAGCAGACACCAGCTT

Human-HBG1/2-F (SEQ ID NO. 10)
AGCACCTGGATGATCTCAAG

Human-HBG1/2-R (SEQ ID NO. 11)
AAACGGTCACCAGCACATTT

Human-HBD-F (SEQ ID NO. 12)
GATGCAGTTGGTGGTGAGG

Human-HBD-R (SEQ ID NO. 13)
GGGTTGCCCATAACAGCAT

Human-HBB-F (SEQ ID NO. 14)
GCACGTGGATCCTGAGAACT

Human-HBB-R (SEQ ID NO. 15)
CACTGGTGGGGTGAATTCTT

Embodiment 2

During the development of zebrafish embryos, Triac, T3 and T4 were incubated with the zebrafish embryos at 96 hours post fertilization. After treatment with Triac, T3 and T4 for 24 hours, respectively, zebrafish embryos were fixed by 4% paraformaldehyde. The expression of zeta-globin gene (hbae5) was detected by Whole-mount mRNA in situ hybridization (WISH).

Figure 2:
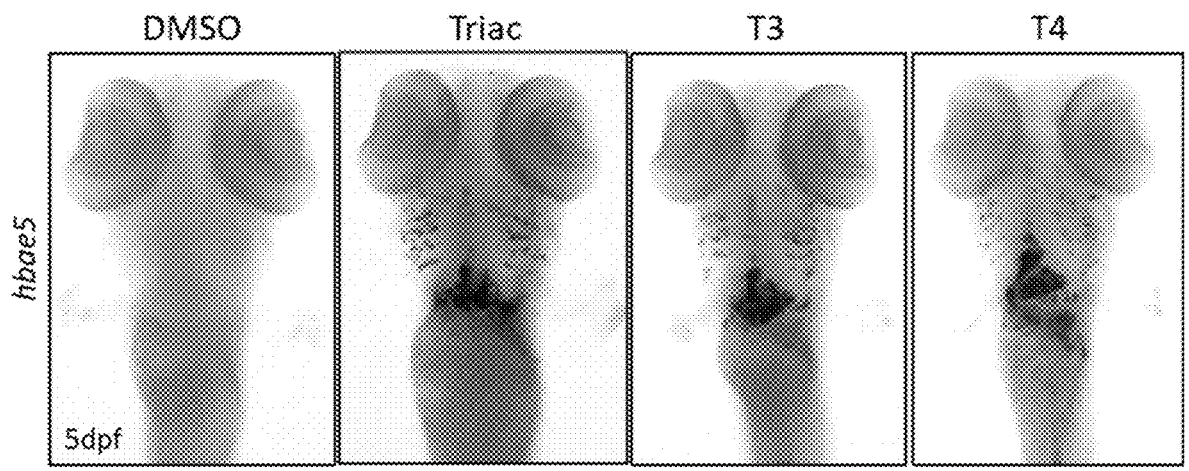
FIG. 2. WISH assay shows Triac, T3 or T4 induced zeta-globin gene (hbae5) expression in zebrafish embryos.

As shown in FIG. 2, Triac, T3 and T4 significantly induce the expression of zeta-globin gene (hbae5) in zebrafish embryos.

Embodiment 3

During the development of zebrafish embryos, Triac, T3 and T4 were incubated with the zebrafish embryos at 96 hours post fertilization. After treatment with Triac, T3 and T4 for 24 hours, respectively, zebrafish embryos were collected. TRIzol reagent (Invitrogen) was used to extract total RNA, then a reverse transcription kit (ReverTra Ace, TOYOBO) was used to synthesize cDNA, and finally, a SYBRGreen Realtime PCR Master Mix (TOYOBO) reagent was used to perform quantitative PCR.

A quantitative PCR reaction system was as follows:

| | |
|---|---|
| 2xSYBR Green PCR Master Mix | 5 ul |
| F-Primer (10 μmol/L) | 0.6 ul |
| R-Primer (10 μmol/L) | 0.6 ul |
| cDNA | 1 ul |
| ddH2O | 2.8 ul |
| Total volume | 10 ul |

Conditions for a quantitative PCR reaction were as follows:
Hot start: 95° C., 10 minutes;
Denaturation: 95° C., 10 seconds; and
Annealing/stretching: 60° C., 30 seconds.
40 cycles.
Dissolution Curve Analysis.

Figure 3:
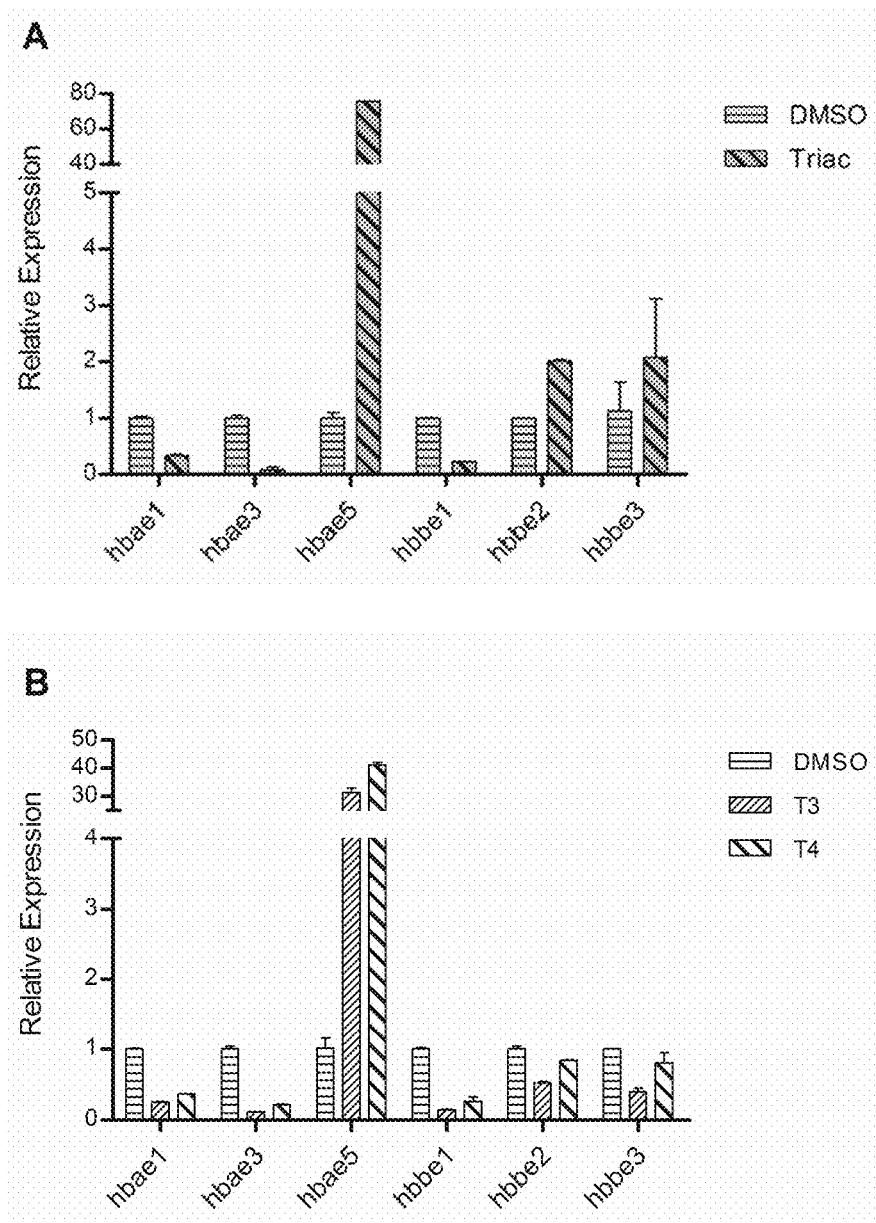
FIG. 3. qPCR shows Triac, T3 or T4 induced zeta-globin gene (hbae5) expression in zebrafish embryos.

As shown in FIG. 3, qPCR result shows that the expression of zeta-globin gene (hbae5) is up-regulated by 76-folds, 31-folds and 41-folds in Triac, T3 and T4-treated zebrafish embryos, respectively.

In fact, the sequence of zebrafish zeta-globin gene (hbae5) (NM_001326701.1) (SEQ ID NO. 16) is as follows:

(SEQ ID NO.16)
ATGAGTCTTTCTGCTAAAGACAAGGCCGCCGTGAGGGGCTTCTGGGCCAAG

ATTGCCCCAAAGGGAGAGCAAATTGGTAACGAGGCGTTTTCCAGATTGCTT

TTGGTGTACCCTCAGACCAAGACCTACTTCTCCCACTGGAACGATCTGGCC

CCCGGCTCTCCCTCTGTGAAGAAGCAGGGAAAGAAGATCGTCGGTGGACTC

GGTCTGGCTGTTGATAAAATCGACGACCTTTTCAACGGCCTGCTGAACCTC

AGTGAATTGCACGCCTTTCAGCTGAGAGTCGACCCTGCTAACTTCAAGCTC

CTGTCTCACTGTCTGCTGGTGGTGTTCGCCATGCTCTTCCCTGATGACTTC

ACCGCTGAGGTCCATCTGGCCATCGACAAGTTCCTGGCAAGAGTGGCTTTG

GCTCTGTCTGACAAATATCGTTAA.

The Realtime PCR primers are as follows:

Zebrafish-β-actin-F (SEQ ID NO. 17)
TGCTGTTTTCCCCTCCATTG

Zebrafish-β-actin-R (SEQ ID NO. 18)
TTCTGTCCCATGCCAACCA

Zebrafish-hbae1-F (SEQ ID NO. 19)
CTGAGGCTGTCAGCAAAATCG

Zebrafish-hbae1-R (SEQ ID NO. 20)
GAACAAAGTGGCCAGAACCAC

Zebrafish-hbae3-F (SEQ ID NO. 21)
GCTGATGGATGACCTGAAGGG

Zebrafish-hbae3-R (SEQ ID NO. 22)
CTCAGGAGTGAAGTCGTCTGG

Zebrafish-hbae5-F (SEQ ID NO. 23)
TGCTGAACCTCAGTGAATTGC

Zebrafish-hbae5-R (SEQ ID NO. 24)
GGAACTTGTCGATGGCCAGAT

Zebrafish-hbbe1-F (SEQ ID NO. 25)
TCCACGTAGATCCCGACAAC

Zebrafish-hbbe1-R (SEQ ID NO. 26)
TACTGTCTTCCCAGAGCGGA

Zebrafish-hbbe2-F (SEQ ID NO. 27)
GGACTGGACAGAGCCATGAAG

Zebrafish-hbbe2-R (SEQ ID NO. 28)
GAGGCAATCACGATTGTCAGG

-continued

Zebrafish-hbbe3-F
(SEQ ID NO. 29)
TTGTGTGGACAGCTGAGGAG

Zebrafish-hbbe3-R
(SEQ ID NO. 30)
ACGGATAGACGACCAAGCAT

The above description of the embodiments is intended to facilitate the understanding and use of the present invention by those of ordinary skill in the art. It will be apparent for those skilled in the art to make various modifications to these embodiments and to apply the general principle described herein to other embodiments without creative effort. Therefore, the present invention is not limited to the above embodiments. Improvements and modifications made by those skilled in the art in accordance with the principle of the present invention without departing from the scope of the present invention should fall within the scope of the present invention.

What is claimed is:

1. A method of treating alpha-thalassemia, comprising administering Triac to a patient with the alpha-thalassemia, wherein the Triac significantly up-regulates expression of a zeta-globin gene.

* * * * *

SEQUENCE LISTING

```
Sequence total quantity: 30
SEQ ID NO: 1            moltype = DNA   length = 429
FEATURE                 Location/Qualifiers
misc_feature            1..429
                        note = human- Globin gene sequence
source                  1..429
                        mol_type = other DNA
                        organism = synthetic construct
SEQUENCE: 1
atgtctctga ccaagactga gaggaccatc attgtgtcca tgtgggccaa gatctccacg    60
caggccgaca ccatcggcac cgagactctg gagaggctct cctcagcca cccgcagacc   120
aagacctact tcccgcactt cgacctgcac ccggggtccg cgcagttgcg cgcgcacggc   180
tccaaggtgg tggccgccgt gggcgacgcg gtgaagagca tcgacgacat cggcggcgcc   240
ctgtccaagc tgagcgagct gcacgcctac atcctgcgcg tggacccggt caacttcaag   300
ctcctgtccc actgcctgct ggtcaccctg gccgcgcgct tccccgccga cttcacggcc   360
gaggcccacg ccgcctggga caagttccta tcggtcgtat cctctgtcct gaccgagaag   420
taccgctga                                                           429

SEQ ID NO: 2            moltype = DNA   length = 18
FEATURE                 Location/Qualifiers
misc_feature            1..18
                        note = Human--actin-F
source                  1..18
                        mol_type = other DNA
                        organism = synthetic construct
SEQUENCE: 2
ccaaccgcga gaagatga                                                  18

SEQ ID NO: 3            moltype = DNA   length = 20
FEATURE                 Location/Qualifiers
misc_feature            1..20
                        note = Human--actin-R
source                  1..20
                        mol_type = other DNA
                        organism = synthetic construct
SEQUENCE: 3
ccagaggcgt acagggatag                                                20

SEQ ID NO: 4            moltype = DNA   length = 17
FEATURE                 Location/Qualifiers
misc_feature            1..17
                        note = Human-HBA1/2-F
source                  1..17
                        mol_type = other DNA
                        organism = synthetic construct
SEQUENCE: 4
aaggtcggcg cgcacgc                                                   17

SEQ ID NO: 5            moltype =       length =
SEQUENCE: 5
000

SEQ ID NO: 6            moltype = DNA   length = 21
FEATURE                 Location/Qualifiers
misc_feature            1..21
                        note = Human-HBZ-F
source                  1..21
                        mol_type = other DNA
                        organism = synthetic construct
SEQUENCE: 6
ggaccatcat tgtgtccatg t                                              21

SEQ ID NO: 7            moltype = DNA   length = 21
```

```
FEATURE                 Location/Qualifiers
misc_feature            1..21
                        note = Human-HBZ-R
source                  1..21
                        mol_type = other DNA
                        organism = synthetic construct
SEQUENCE: 7
gggaagtagg tcttggtctg c                                              21

SEQ ID NO: 8            moltype = DNA  length = 20
FEATURE                 Location/Qualifiers
misc_feature            1..20
                        note = Human-HBE1-F
source                  1..20
                        mol_type = other DNA
                        organism = synthetic construct
SEQUENCE: 8
tgcatgtgga tcctgagaac                                                20

SEQ ID NO: 9            moltype = DNA  length = 19
FEATURE                 Location/Qualifiers
misc_feature            1..19
                        note = Human-HBE1-R
source                  1..19
                        mol_type = other DNA
                        organism = synthetic construct
SEQUENCE: 9
cgacagcaga caccagctt                                                 19

SEQ ID NO: 10           moltype = DNA  length = 20
FEATURE                 Location/Qualifiers
misc_feature            1..20
                        note = Human-HBG1/2-F
source                  1..20
                        mol_type = other DNA
                        organism = synthetic construct
SEQUENCE: 10
agcacctgga tgatctcaag                                                20

SEQ ID NO: 11           moltype = DNA  length = 20
FEATURE                 Location/Qualifiers
misc_feature            1..20
                        note = Human-HBG1/2-R
source                  1..20
                        mol_type = other DNA
                        organism = synthetic construct
SEQUENCE: 11
aaacggtcac cagcacattt                                                20

SEQ ID NO: 12           moltype = DNA  length = 19
FEATURE                 Location/Qualifiers
misc_feature            1..19
                        note = Human-HBD-F
source                  1..19
                        mol_type = other DNA
                        organism = synthetic construct
SEQUENCE: 12
gatgcagttg gtggtgagg                                                 19

SEQ ID NO: 13           moltype = DNA  length = 19
FEATURE                 Location/Qualifiers
misc_feature            1..19
                        note = Human-HBD-R
source                  1..19
                        mol_type = other DNA
                        organism = synthetic construct
SEQUENCE: 13
gggttgccca taacagcat                                                 19

SEQ ID NO: 14           moltype = DNA  length = 20
FEATURE                 Location/Qualifiers
misc_feature            1..20
                        note = Human-HBB-F
source                  1..20
                        mol_type = other DNA
                        organism = synthetic construct
SEQUENCE: 14
gcacgtggat cctgagaact                                                20
```

```
SEQ ID NO: 15            moltype = DNA   length = 20
FEATURE                  Location/Qualifiers
misc_feature             1..20
                         note = Human-HBB-R
source                   1..20
                         mol_type = other DNA
                         organism = synthetic construct
SEQUENCE: 15
cactggtggg gtgaattctt                                                   20

SEQ ID NO: 16            moltype = DNA   length = 432
FEATURE                  Location/Qualifiers
misc_feature             1..432
                         note = Zebrafish - Globin gene sequence
source                   1..432
                         mol_type = other DNA
                         organism = synthetic construct
SEQUENCE: 16
atgagtcttt ctgctaaaga caaggccgcc gtgaggggct tctgggccaa gattgcccca        60
aagggagagc aaattggtaa cgaggcgttt tccagattgc ttttggtgta ccctcagacc       120
aagacctact tctcccactg gaacgatctg gcccccggct ctccctctgt gaagaagcag       180
ggaaagaaga tcgtcggtgg actcggtctg gctgttgata aaatcgacga cctttttcaac      240
ggcctgctga acctcagtga attgcacgcc tttcagctga gagtcgaccc tgctaacttc      300
aagctcctgt ctcactgtct gctggtggtg ttcgccatgc tcttccctga tgacttcacc      360
gctgaggtcc atctggccat cgacaagttc ctggcaagag tggctttggc tctgtctgac      420
aaaatatcgtt aa                                                         432

SEQ ID NO: 17            moltype = DNA   length = 20
FEATURE                  Location/Qualifiers
misc_feature             1..20
                         note = Zebrafish--actin-F
source                   1..20
                         mol_type = other DNA
                         organism = synthetic construct
SEQUENCE: 17
tgctgttttc ccctccattg                                                   20

SEQ ID NO: 18            moltype = DNA   length = 19
FEATURE                  Location/Qualifiers
misc_feature             1..19
                         note = Zebrafish--actin-R
source                   1..19
                         mol_type = other DNA
                         organism = synthetic construct
SEQUENCE: 18
ttctgtccca tgccaacca                                                    19

SEQ ID NO: 19            moltype = DNA   length = 21
FEATURE                  Location/Qualifiers
misc_feature             1..21
                         note = Zebrafish-hbae1-F
source                   1..21
                         mol_type = other DNA
                         organism = synthetic construct
SEQUENCE: 19
ctgaggctgt cagcaaaatc g                                                 21

SEQ ID NO: 20            moltype = DNA   length = 21
FEATURE                  Location/Qualifiers
misc_feature             1..21
                         note = Zebrafish-hbae1-R
source                   1..21
                         mol_type = other DNA
                         organism = synthetic construct
SEQUENCE: 20
gaacaaagtg gccagaacca c                                                 21

SEQ ID NO: 21            moltype = DNA   length = 21
FEATURE                  Location/Qualifiers
misc_feature             1..21
                         note = Zebrafish-hbae3-F
source                   1..21
                         mol_type = other DNA
                         organism = synthetic construct
SEQUENCE: 21
gctgatggat gacctgaagg g                                                 21

SEQ ID NO: 22            moltype = DNA   length = 21
FEATURE                  Location/Qualifiers
```

```
                          misc_feature        1..21
                                              note = Zebrafish-hbae3-R
                          source              1..21
                                              mol_type = other DNA
                                              organism = synthetic construct
SEQUENCE: 22
ctcaggagtg aagtcgtctg g                                                      21

SEQ ID NO: 23             moltype = DNA  length = 21
FEATURE                   Location/Qualifiers
misc_feature              1..21
                                              note = Zebrafish-hbae5-F
source                    1..21
                                              mol_type = other DNA
                                              organism = synthetic construct
SEQUENCE: 23
tgctgaacct cagtgaattg c                                                      21

SEQ ID NO: 24             moltype = DNA  length = 21
FEATURE                   Location/Qualifiers
misc_feature              1..21
                                              note = Zebrafish-hbae5-R
source                    1..21
                                              mol_type = other DNA
                                              organism = synthetic construct
SEQUENCE: 24
ggaacttgtc gatggccaga t                                                      21

SEQ ID NO: 25             moltype = DNA  length = 20
FEATURE                   Location/Qualifiers
misc_feature              1..20
                                              note = Zebrafish-hbbe1-F
source                    1..20
                                              mol_type = other DNA
                                              organism = synthetic construct
SEQUENCE: 25
tccacgtaga tcccgacaac                                                        20

SEQ ID NO: 26             moltype = DNA  length = 20
FEATURE                   Location/Qualifiers
misc_feature              1..20
                                              note = Zebrafish-hbbe1-R
source                    1..20
                                              mol_type = other DNA
                                              organism = synthetic construct
SEQUENCE: 26
tactgtcttc ccagagcgga                                                        20

SEQ ID NO: 27             moltype = DNA  length = 21
FEATURE                   Location/Qualifiers
misc_feature              1..21
                                              note = Zebrafish-hbbe2-F
source                    1..21
                                              mol_type = other DNA
                                              organism = synthetic construct
SEQUENCE: 27
ggactggaca gagccatgaa g                                                      21

SEQ ID NO: 28             moltype = DNA  length = 21
FEATURE                   Location/Qualifiers
misc_feature              1..21
                                              note = Zebrafish-hbbe2-R
source                    1..21
                                              mol_type = other DNA
                                              organism = synthetic construct
SEQUENCE: 28
gaggcaatca cgattgtcag g                                                      21

SEQ ID NO: 29             moltype = DNA  length = 20
FEATURE                   Location/Qualifiers
misc_feature              1..20
                                              note = Zebrafish-hbbe3-F
source                    1..20
                                              mol_type = other DNA
                                              organism = synthetic construct
SEQUENCE: 29
ttgtgtggac agctgaggag                                                        20

SEQ ID NO: 30             moltype = DNA  length = 20
```

-continued

| FEATURE | Location/Qualifiers |
|---|---|
| misc_feature | 1..20<br>note = Zebrafish-hbbe3-R |
| source | 1..20<br>mol_type = other DNA<br>organism = synthetic construct |

SEQUENCE: 30
acggatagac gaccaagcat                    20